INVENTOR
GEORGE N. BLISS
BY Karl W. Flocks
ATTORNEY

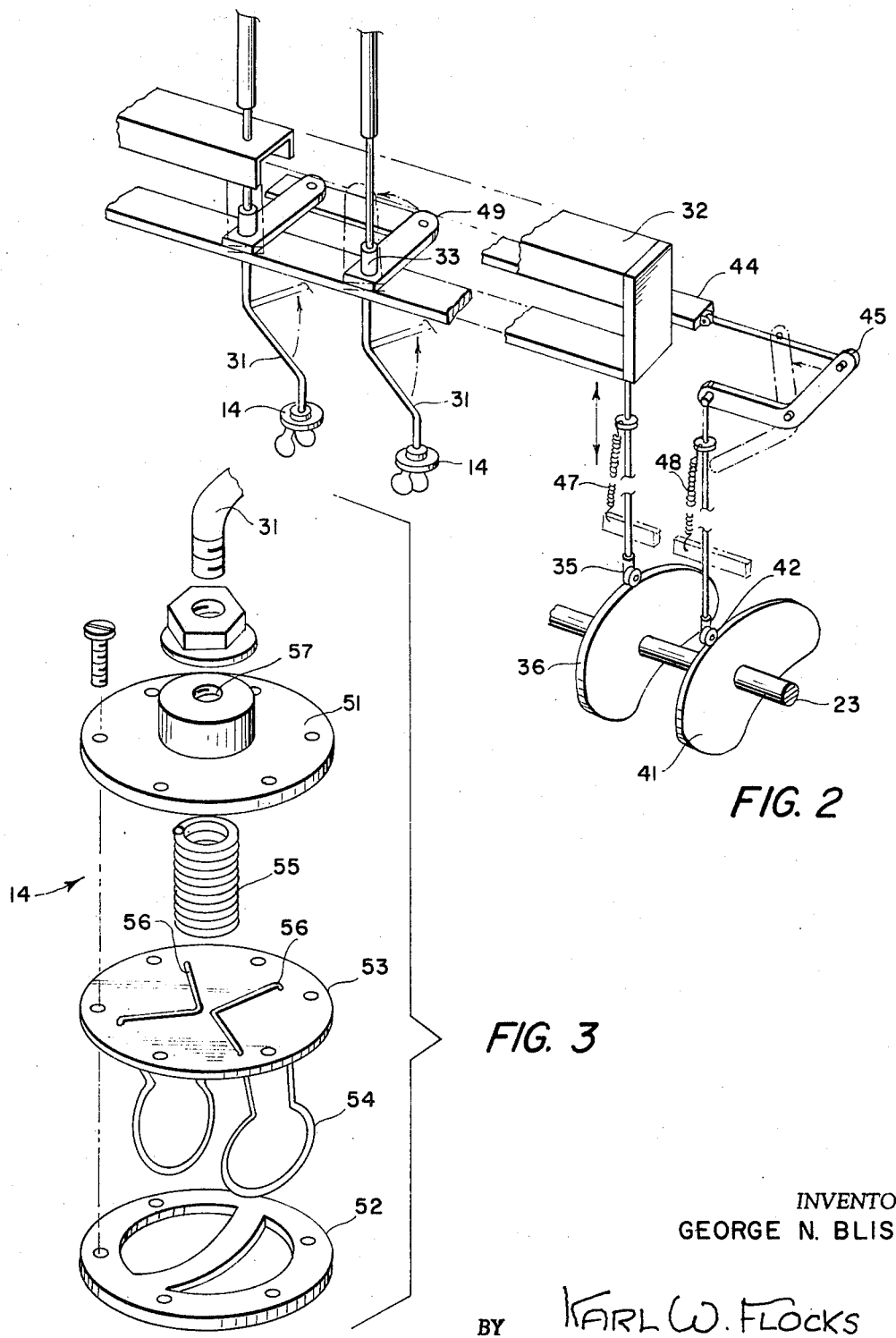

May 12, 1970  G. N. BLISS  3,511,367
QUALITY SELECTOR AND TRANSFER MACHINE
Filed Aug. 30, 1967  6 Sheets-Sheet 3

INVENTOR
GEORGE N. BLISS

BY  Karl W. Flocks

ATTORNEY

May 12, 1970  G. N. BLISS  3,511,367
QUALITY SELECTOR AND TRANSFER MACHINE
Filed Aug. 30, 1967  6 Sheets-Sheet 4

INVENTOR
GEORGE N. BLISS

BY Karl W Flocks

ATTORNEY

INVENTOR
GEORGE N. BLISS

BY Karl W. Flocks
ATTORNEY

May 12, 1970 G. N. BLISS 3,511,367
QUALITY SELECTOR AND TRANSFER MACHINE
Filed Aug. 30, 1967 6 Sheets-Sheet 6

INVENTOR
GEORGE N. BLISS

BY KARL W. FLOCKS

ATTORNEY

United States Patent Office 3,511,367
Patented May 12, 1970

3,511,367
QUALITY SELECTOR AND TRANSFER MACHINE
George N. Bliss, Franklin, Mich., assignor to Diamond International Corporation, New York, N.Y., a corporation of Delaware
Filed Aug. 30, 1967, Ser. No. 664,436
Int. Cl. B07c 5/344
U.S. Cl. 209—73          11 Claims

ABSTRACT OF THE DISCLOSURE

A machine for transferring eggs from a side-by-side formation on a conveyor to a single file on a faster moving conveyor, using mechanical finger means. The single file conveyor is comprised of formed wire cradles, each pair of cradle wires operable clam shell fashion so as to be capable of carrying an egg, releasing an egg, or picking up an egg from a track on which the egg may be rolling or from a conveyor traveling beneath said wire cradle conveyor. Eggs are automatically inspected for blood, cracks, and presence of albumen, which may be smeared on the shells. Defective eggs are subsequently released from the wire cradles. The machine may be coded so as to release cracked eggs into one category, eggs both cracked and smeared with albumen into a second category, and passing eggs merely smeared with albumen on the assumption that they are sound eggs which have been smeared by other broken eggs.

---

The present invention relates to a machine for transferring eggs on a conveyor while checking the quality of the eggs.

In the present invention eggs are transferred from side-by-side formation on one conveyor to single file order on a second conveyor and rotated 90° in the horizontal plane during the transfer.

It is an object of the present invention to use a transfer device with mechanical means constructed so as to avoid clogging as with suction cups, by water and any other matter on the eggs which have just left the egg washing machines.

It is also an object of the present invention to use a transfer device which can transfer an egg or group of eggs from a slower to a faster moving conveyor.

It is a further object of the present invention to utilize a conveyor which may be easily controlled to pick up eggs, as for instance from another conveyor traveling beneath it and moving with the conveyor of the present invention, carry the eggs and release the eggs while still pushing them and rolling them, and also to completely release the eggs.

With the present invention, eggs on a conveyor can be checked for cracks, leaks, and blood spots and removed from the conveyor at designated points so as to be placed with groups having similar defects.

The present invention allows the checking of the eggs for cracks while moving on the conveyor and also allows differentiation between leaky eggs and those that have merely been smeared by contact with leaky eggs.

Furthermore, with the transfer devices of the present invention, by proper positioning in their attachment to the machine, they may be used to pick eggs off a faster conveyor and place them on a slower conveyor while changing them from positions behind each other to side-by-side positions.

Figure 1:
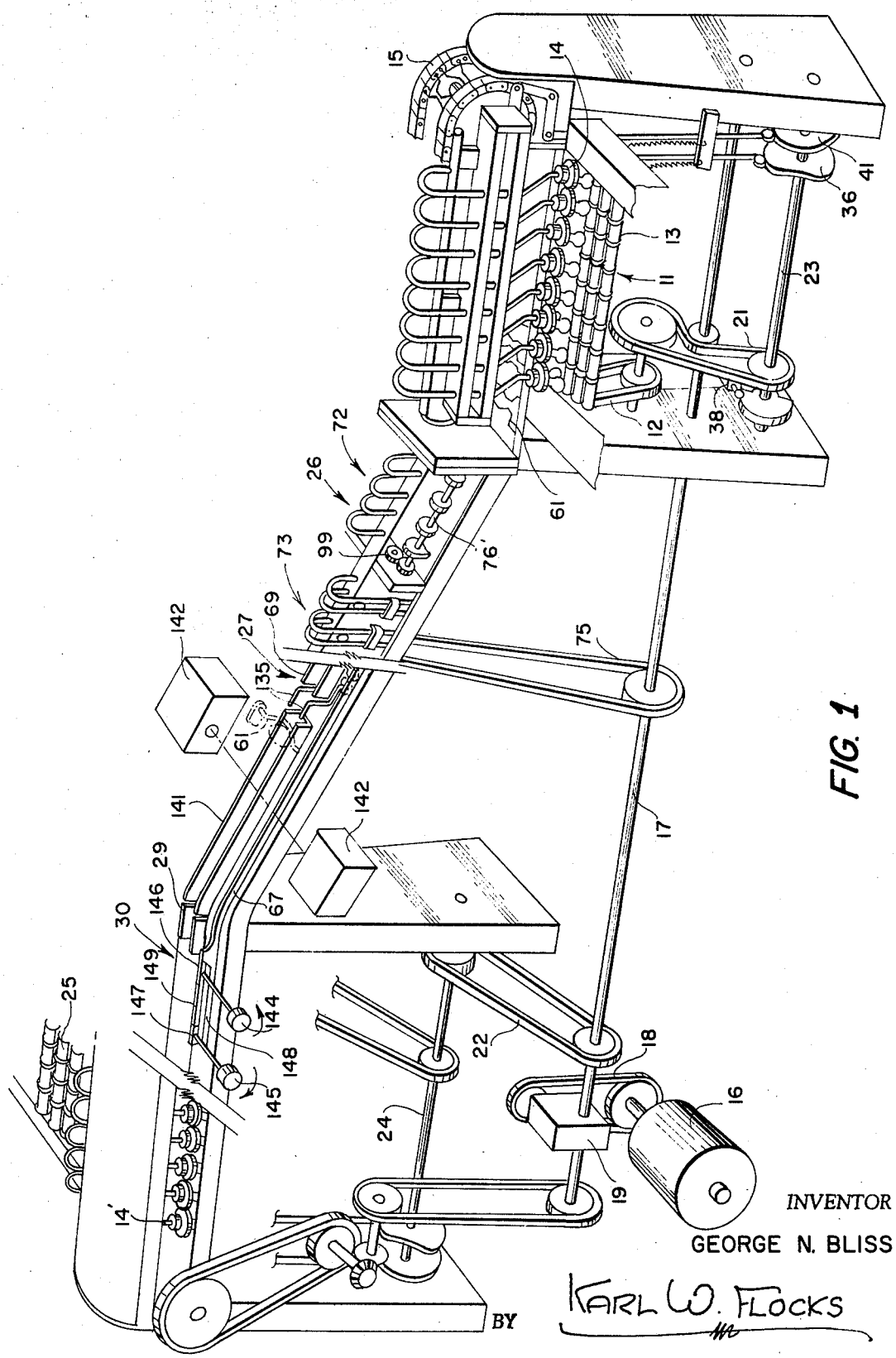
Figure 5:
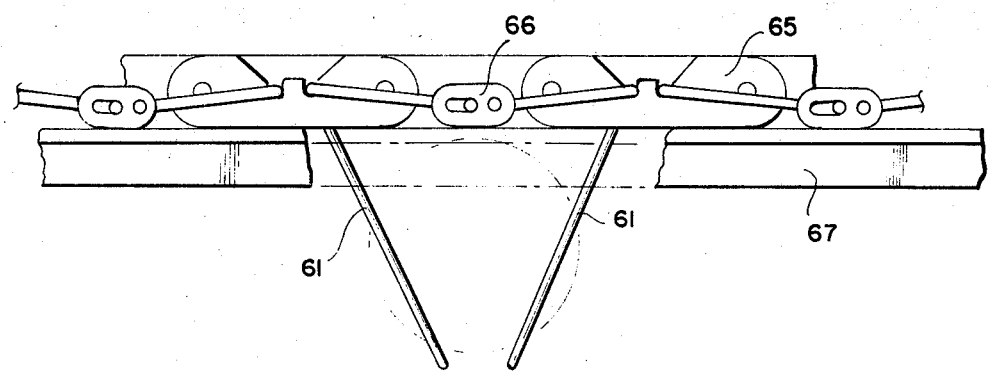
Figure 6:
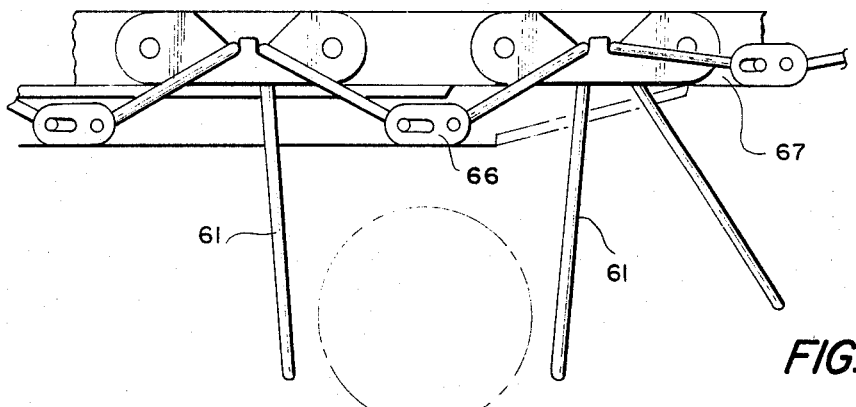
Figure 4:
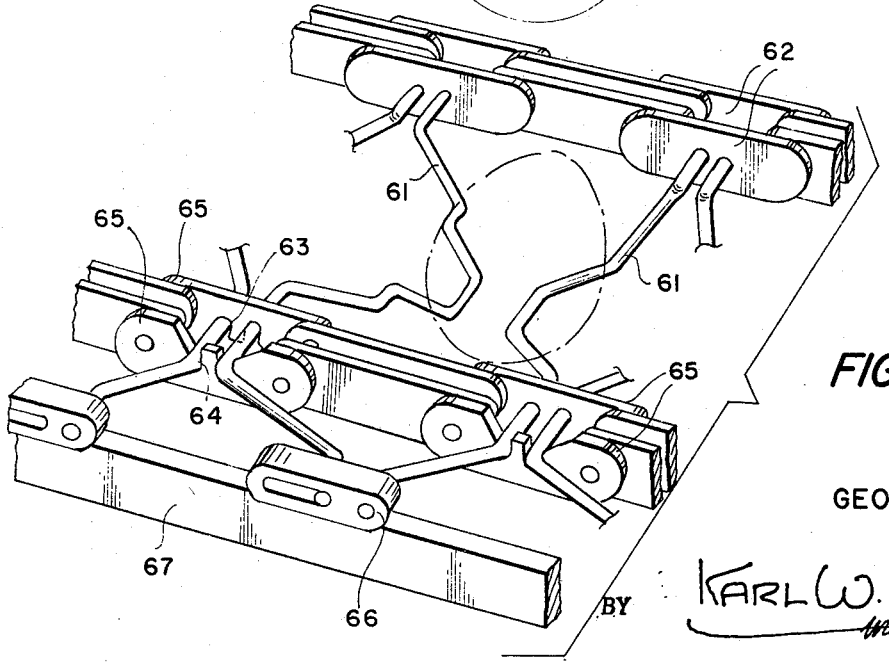
Figure 7:
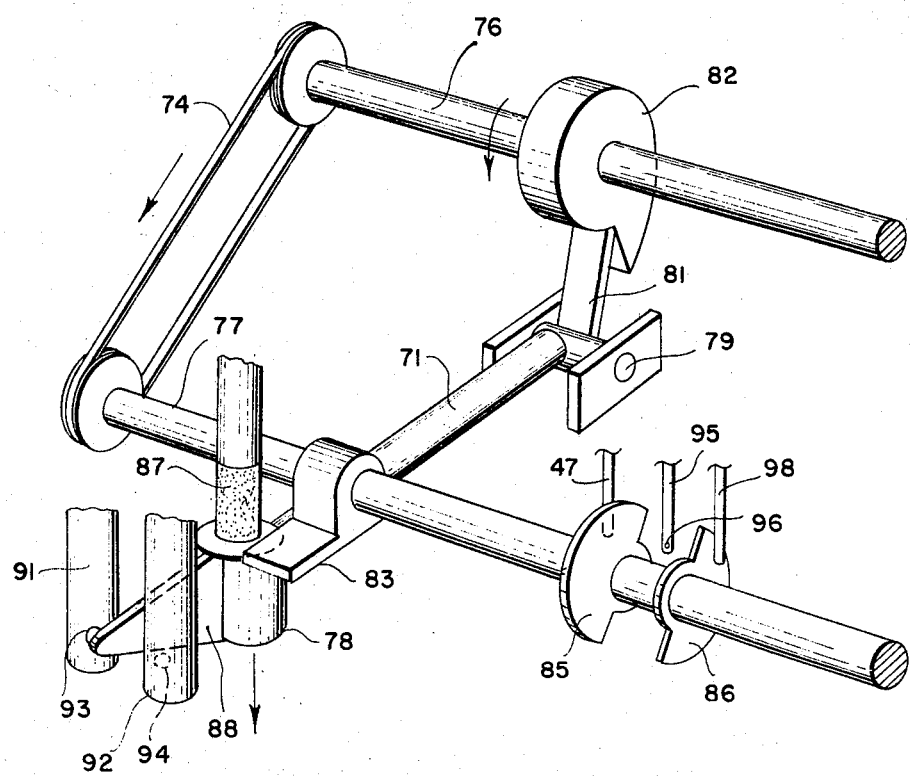
Figure 9:
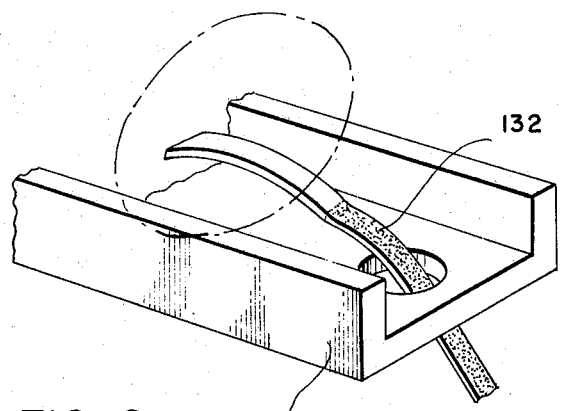
Figure 8:
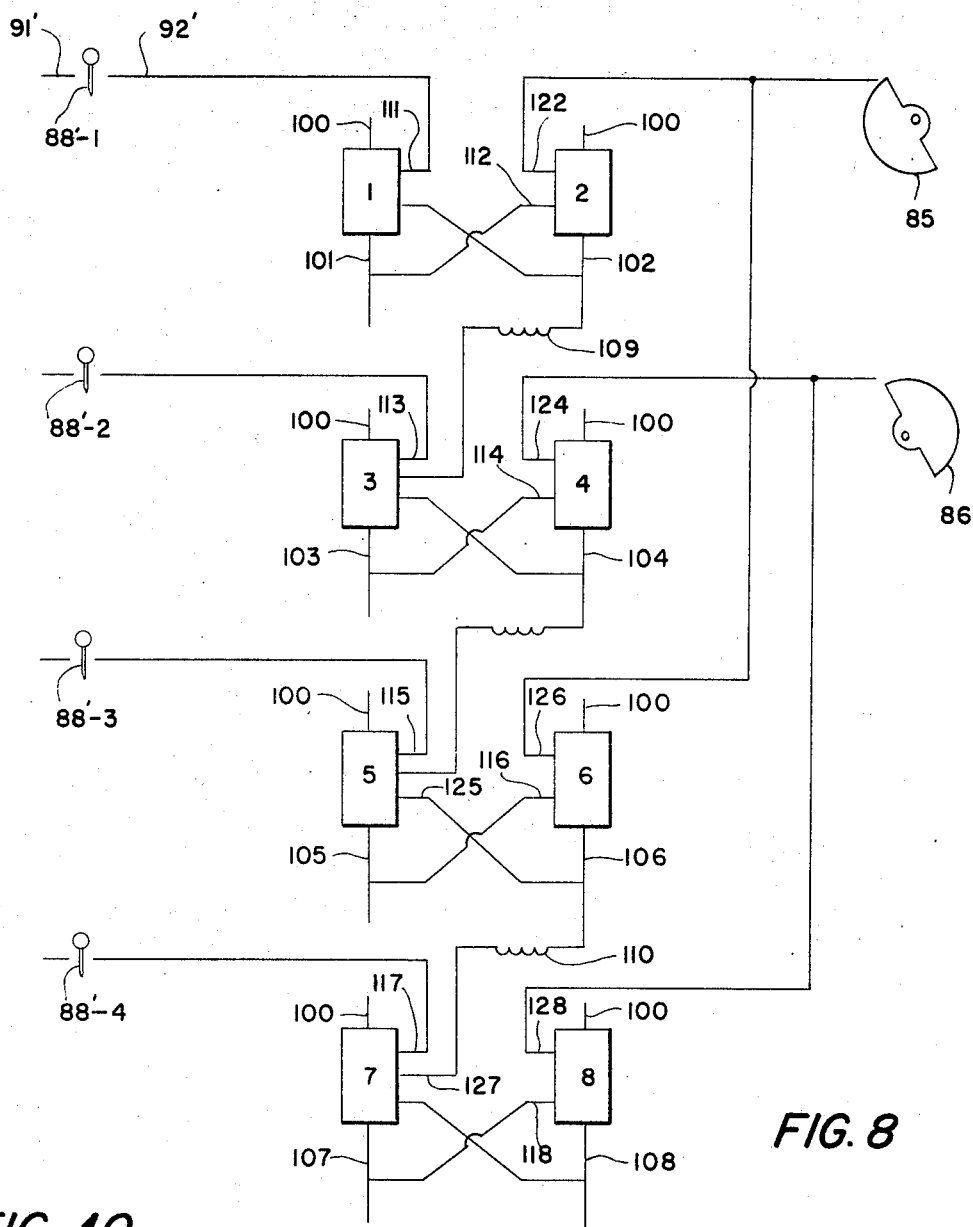
Figure 10:
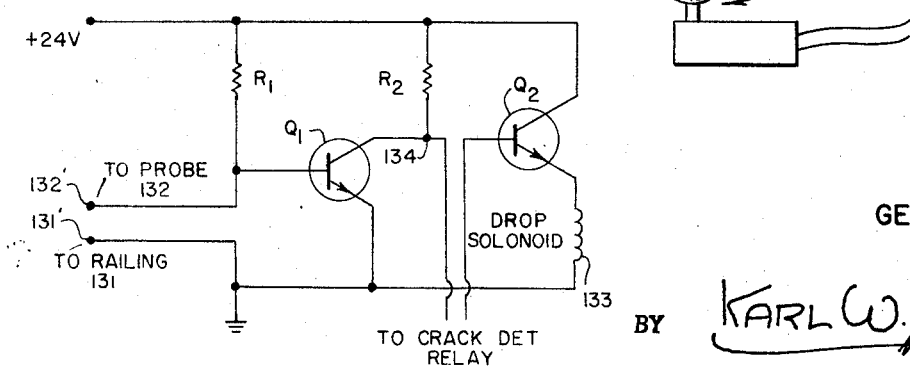
Figure 11:
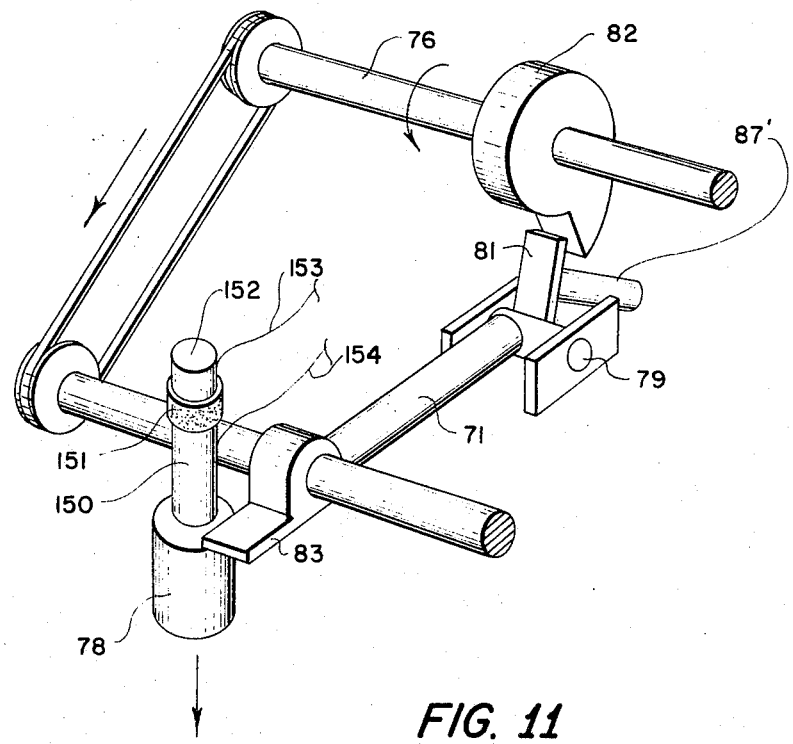

These, as well as further objects, and advantages which are inherent in the invention, will become apparent from the following description, reference being had to the accompanying drawing wherein:

FIG. 1 is a partial perspective of the overall machine of the present invention;
FIG. 2 is an enlarged partial perspective of the transfer portion between conveyors at one end of the machine;
FIG. 3 is a further enlarged exploded perspective view of a transfer device forming part of the transfer portion of FIG. 2;
FIG. 4 is an enlarged perspective of a portion of the wire cradle conveyor;
FIGS. 5 and 6 are side elevation views of the wire cradle conveyor of FIG. 4 in egg supporting and releasing positions, respectively;
FIG. 7 is a perspective view of a portion of the crack detector section of the machine of FIG. 1;
FIG. 8 is a schematic diagram of fluid flow in the crack detector section of the present machine;
FIG. 9 is a perspective view of an embodiment of a leak detector for use in the machine of FIG. 1;
FIG. 10 is a schematic diagram of the electrical circuit in the leak detector section of FIG. 9; and
FIG. 11 is a perspective view of a modified embodiment of the portion of the crack detector section shown in FIG. 7.

Referring first to FIG. 1, therein is shown an overall perspective view of the machine of the present invention. Eggs are usually received on spool conveyor 11 from a washer (not shown) but may also be received from some storage or packing container. Spool conveyor 11 is operated by chain drive 12 and sprocket wheels (not shown) which are connected so as to rotate the spools 13 during their movement toward transfer devices 14. This spool rotation causes the eggs on conveyor 11 to be aligned with their longitudinal axes in a direction transverse to the movement of spools 13.

The number of transfer devices 14 which are used is usually more than the amount shown. The number is determined by the width of spool conveyor 11 and the relative speeds of spool conveyor 11 and wire cradle conveyor 15. A preferable number used in the egg industry is twelve transfer devices 14.

The mechanism operating the group of transfer devices 14 is shown in greater detail in FIG. 2 and an individual transfer device 14 in detail is shown in FIG. 3.

The operation of the overall machine is through a motor 16 rotating main drive bar 17 through chain belt 18 and gear box 19. Through chain belts 21 and 22, rods 23 and 24, respectively, are rotated and thereby rotate cams thereon which operate transfer devices 14. Also driven from main drive bar 17 through gearing and chain belts connected to bar 17 are spool conveyor 11, wire cradle conveyor 15, spool conveyor 25 and cams associated with the cracked egg detector section 26 of the machine. In this manner, all sections of the machine have their operation synchronized with each other.

In general, the movement of the eggs through the machine is as follows. Transfer devices 14 pick the eggs off spool conveyor 11 and place them in wire cradle conveyor 15. Conveyor 15 moves the eggs through cracked egg detector section 26, leak detector section 27, blood detector section 28, weighing device 29, and solenoid release section 30. Eggs without defects still remaining on conveyor 15 are picked up by transfer devices 14' and placed on spool conveyor 25 for any necessary further processing and packaging.

Transfer devices 14 with the operating mechanism connected thereto shown in detail in FIG. 2, and the details of the device 14 shown in FIG. 3, are mechanical-vacuum finger devices. Each transfer device 14 is connected to a hollow shaped pipe 31 which is mounted to rotate in support 32 but because of collar 33 attached to each pipe 31, the vertical motion of support 32 will also raise and lower transfer devices 14. The vertical reciprocation of support 32 is produced by the action of vertical reciprocating rod 34 attached at its upper end to support 32 and with cam follower 35 riding on cam 36. Cam 36 is rotated on rod 23 on which rod there is also mounted cams 37 and 41. Cam 37 operates spool valve 38 which opens and closes a vacuum system valve which connects to hollow pipes 31 attached to transfer devices 14. Cam 41 moving in unison with cams 36 and 37 controls the rotational movement of transfer devices 14 through cam follower 42 attached to vertical reciprocating rod 43 which attaches to horizontally reciprocating bar 44 through V linkage 45. Both vertical reciprocating rods 34 and 43 have springs 47 and 48 respectively attached to them so as to keep the respective cam followers 35 and 42 pressed against their respective cams 36 and 41.

Attached to each of collars 33 on pipe 31 of each transfer device 14 is a linking element 49 which has its opposite end pivotally attached to horizontally reciprocating bar 44. The limit of reciprocation of bar 44 allows the rotation of each of the transfer devices through an arc of approximately 90° with transfer device 14 positioned over spool conveyor 11 at one exteme of the arc of rotation and over wire cradle conveyor 15 at the other extreme.

Each of the transfer devices 14, as shown in FIG. 3 has an upper support 51 and lower support 52 between which is sandwiched a diaphragm 53. Extending through diaphragm 53 are two wire lops 54 with the loops concentrically placed so as to form two opposing fingers. The upper portions 56 of wire loops 54 are bent so as to lie flat against diaphragm 53. A spring 55 is compressed between upper support 51 and upper portions 56. Hollow pipe 31 is attached to upper support 51 in threaded opening 57 which passes through support 51. The action of transfer device 14 is such that when vacuum is "applied" through pipe 31, the sealed space between diaphragm 53 and upper support 51 is evacuated thereby forcing the center of diaphragm 53 against the action of spring 55 toward upper support 51 and by this action moving upper portions 56 upward with diaphragm 53. This causes wire loops 54 to pivot at their points which pass through diaphragm 53 moving the lower loops portions toward each other. When transfer device 14 is in a lowered position not connected to vacuum then the lower loops are spread apart and can be positioned on each side of an egg, for instance on spool conveyor 11. Upon connection to vacuum the space above diaphragm 53 is evacuated causing the lower loops to move toward each other and grasp the egg between them. Through movements previously explained, transfer device 14 is raised, then rotated and lowered above the lower run of wire cradle conveyor 15. Air is allowed to return to the evacuated area above diaphragm 53 causing downward expansion of the diaphragm center due to the action of spring 55. The spring also forces upper portions 56 downward thereby pivoting lower portions of wire loops 54 outward and releasing the egg.

Although a combination suction and mechanical transfer device 14 is illustrated here, a similarly acting transfer device operated by fluid pressure, electrically or mechanically or a combination thereof, could be substituted but since eggs have been washed in the process, care should be taken to use a transfer device which will not become clogged by water or foreign matter.

Also, it should be noted that because of the construction of the conveyor 15 utilizing cradle formed by wires 61, the conveyor may be positioned so as to do without a transfer device and act to pick up or drop eggs onto a conveyor positioned below it and adapted to move with it.

The egg is received on wire cradle conveyor 15, an enlarged portion of which is shown in FIG. 4. This conveyor 15 carries the eggs on its lower run and returns empty on an upper run. The egg is supported on wires 61 which are shaped as shown in FIG. 4 and mounted so as to have one end of wire 61 extend into an opening in an inner side of link 62 of the sprocket chain of conveyor 15, and have its other end extend through a pair of oppositely directed indentations 63 and 64 in link 65 into nylon or similar material band 66. Wires 61 are held in place between links 62 and 65 by compressive spring action of each wire 61. It should be noted that one cradle holding a single egg is formed by a pair of wires 61 which are adjacent each other but connected to different links 62 and 65. Wires 61 which are connected to the same links 62 and 65 are each a side of a different cradle. Each band 66 holds together the ends of wires 61 which form a single cradle. Band 66 rides on a guide bar 67 and is held down against bar 67 by its weight and additionally by the weight of the egg on wires 61 since wires 61 are so mounted as to rotate while rotationally held at links 62 and 65. It is possible that instead of a single band 66 around two adjacent ends of wires 61 that each end could have a separate band but the illustrated construction is preferred.

As can be seen in FIGS. 5 and 6, the position of band 66 in either a raised or lowered position determines the opening and closing of the wires 61 forming the cradle. With band 66 in a raised position on guide bar 67 the bottom portions of cradle wires 61 are close enough to each other to support an egg therebetween as in FIG. 5. When band 66 passes into a depression in guide bar 67, as shown in FIG. 6, the rotation of the ends and the cradle portions of wires 61 separate and no longer support the egg. If, as in some portions of the machine a pair of rails are located below wire cradle conveyor 15, then the egg though released is still moved, being pushed and rolled along the rails by wires 61.

The eggs traveling in single file in wire cradle conveyor 15 start up the inclined portion of the machine and the cradles are opened allowing the eggs to roll on the pair of rails 69. At this point the eggs encounter cracked egg detector section 26 which consists of eight hammers 71 which tap the egg as it is rolled up the incline on rails 69. Four hammers 71 in first portion 72 of cracked egg detector section 26 extend transversely of conveyor 15 in one direction and the other four hammers 71 of second portion 73 extend transversely of conveyor 15 in the opposite direction, therefore an egg passing the hammers is tapped four times in the vicinity of one end and four times in the vicinity of its opposite end. Since the egg is being rolled while it is being tapped, there will be no point on the egg more than ¾ of an inch away from where it has been tapped. It has been found that when a hammer 71 taps an egg that is solid, i.e., with no crack therein, the hammer 71 will rebound. If there is a crack within about ¾ of an inch of where the hammer 71 strikes, the hammer 71 will not rebound. The machine is set so that when a hammer does not rebound, a red signal light (not shown) is lit and the information is fed to a memory device (not shown) which will dispose of the egg at a later point along conveyor 15.

In order to detect whether a hammer 71 rebounds, a system using photoelectric cells which would detect whether the hammer head was rebounded from the egg back to its original position is entirely feasible. In the system illustrated, a system based on the principles of fluidics in logic circuitry instead of photoelectric cells has been used.

FIG. 7 illustrates one of the eight hammers 71 with its auxiliary operating parts. In this figure, belt 74 which is operated in conjunction with chain belt 75 driven by main drive bar 17, rotates rods 76 and 77 in timed relation with each other. Hammer 71 having a head 78 is pivotally mounted by its opposite end to a stationary portion of the machine at pivot point 79. Attached to hammer 71 at the pivotally mounted end is a restoring spring 81 which extends into contacting relation with cam 82 which is mounted to rotate with rod 76. Mounted on rod 77 so as to rotate therewith are pusher lever 83 and semicircular vanes 85 and 86. Contacting head 78 when hammer 71 is in a raised position is stationary mounted magnet 87. A fin 88 extending from head 78 is positioned so as to extend between a pair of hollow tubes 91 and 92, one of which is connected to air under pressure and the other so as to detect air flow. Openings 93 and 94 in tubes 91 and 92 respectively are aligned and facing each other. The air flow out of opening 93, for instance, when tube 91 is connected to air under pressure, causes a detectable air flow through opening 94 and in tube 92 when the air flow is not interrupted by fin 88, as when the hammer 71 is in a raised position with head 78 against magnet 87. In addition, air under pressure is connected to tube 95 centered between vanes 85 and 86 and having openings 96 facing toward each of openings on the sides of tubes 97 and 98 and aligned with these openings. Air flow in either tube 97 or tube 98 can be detected by connected devices to these tubes whenever such air flow takes place through positioning of vanes 85 or 86 so as not to interrupt this flow between openings in the respective tubes.

For each of the eight hammers 71 in cracked egg detector section 26 there is associated a cam 82, restoring spring 81, pusher lever 83, magnet 87, and a pair of tubes 91 and 92. Only one set of tubes 95, 96 and 97 and only one pair of vanes 85 and 86 are necessary. As previously mentioned, the four hammers 71 in first portion 72 of section 26 extend in one direction and four hammers 71 in second portion 73 extend in the opposite direction. The positioning of hammer 71 in FIG. 7 in relation to the overall machine in FIG. 1 would place this hammer and associated parts in second portion 73. Three additional cams 82 are located on rod 76 in slightly revolved relationship with each other and similarly three additional pusher levers 83 are mounted on rod 77 in a revolved relationship to each other.

Through gear train 99 connection is made from rod 76 to rod 76' on which are mounted the four remaining cams 82. An additional rotating rod (not shown) has the remaining four pusher levers 83 mounted thereon.

As an egg is rolled by wire cradle conveyor 15 along rails therebelow, beneath each hammer 71, rod 77 rotates in timed relation to the movement of the egg and as the egg passes, pusher lever 83 pushes downward on head 78 breaking its contact with magnet 87 and due to the spring-like flexibility of lever 83, shoots head 78 at the egg. If there are no cracks near the portion of the egg struck, then head 78 will immediately rebound and be caught by magnet 87. If head 78 strikes near a crack, then it will not rebound and it will be reset after a set time by the action of cam 82 against restoring spring 81 which will pivot hammer 71 so as to bring head 78 into contact with magnet 87.

The rebound of hammer 71 of cracked egg detector, section 26 may be detected in a variety of other ways. Various types of proximity sensors are feasible. Also, the hammer head may be set so as to rebound against a piezoelectric crystal which could then feed information into an integrated circuit shift register. The modification to include a piezoelectric crystal is illustrated in FIG. 11. Magnet 87' is now positioned in back of restoring spring 81 underneath cam 82 where it serves the same function of holding hammer 71 in a raised position until it is knocked down by pusher lever 83. Upon rebounding when encountering an uncracked egg, hammer head 78 strikes bar 150, transmitting the impact to piezoelectric crystal 151 which is sandwiched between bars 150 and 152. When subjected to the forces of impact, the crystal generates voltage spike bars 150 and 152 and is carried to a memory system on wires 153 and 154.

The above-described mechanical operation of the cracked egg detector section 26 of FIG. 7 is combined with the fluidic operation of that section to signal the presence of a crack in an egg to a memory system so as to remove the egg at a later point in the quality selection process.

This fluidic system used in logic circuitry is shown in schematic circuit form in FIG. 8 for four hammers 71 and may be extended in a similar form to operation with the eight hammers.

Each of the blocks 1 through 8 represents a turbulence amplifier with the logic circuitry representing NOR circuits used in a flip-flop arrangement. With NOR circuits any input will cause no output to be obtained from the turbulence amplifier. In general, the operation of the turbulence amplifier, which is known in prior art, operates so that a jet of fluid through the input supply passes through the body of the amplifier to the output where this jet is passed out of the amplifier to be detected and used. If there is any input, and inputs are positioned substantially at right angles to the supply jet, that input will deflect the jet in the amplifier so that it will be expelled through a vent and not through the aligned output. Therefore, any input will deflect the supply and eliminate an output.

In FIG. 8, each turbulence amplifier 1–8 has a supply 100 for a jet of fluid through that amplifier and the amplifiers 1–8 have outputs 101–108, respectively. The jet of fluid through supplies 100 is continuous and there is an output at each of outputs 101–108 unless cut off by flow through one of the inputs to that particular amplifier.

With hammers 71 in raised position, fins 88' cut off flow between lines 91' and 92', which schematically represent fins 88 and tubes 91 and 92, respectively. With no flow to inputs 111, 113, 115, 117 because of the interruption to flow by fins 88'–1, 88'–2, 88'–3, and 88'–4 there is flow through each of outputs 101, 103, 105 and 107 which, in turn, causes a flow to inputs 112, 114, 116 and 118. Due to this flow at these inputs the flow to outputs 102, 104, 106 and 108 are each cut off in respective amplifiers 2, 4, 6 and 8. Therefore, there is no flow at output 108 which would operate a diaphragm operated microswitch 109.

Assuming that an egg with a crack passes through cracked egg detector section 26, the following events take place:

If hammer 71 with fin 88'–1 thereon does not tap the egg within ¾ of an inch of the crack, it will rebound immediately. The fluidic action is such that, as the hammer descends and returns, flow takes place to input 111 cutting off turbulence amplifier 1 which stops flow through output 101 to input 112 of amplifier 2. In timing with the drop of fin 88'–1, the vane 85 is rotated to open flow through input 122 of amplifier 2 which cuts off flow to output 102. Rotation of vane 85 is so timed as to allow fin 88'–1 to return to raised, blocking position if hammer 71 rebounds. In such case fin 88'–1 returns to cut off flow to input 111 before flow to input 122 is closed. With flow to input 111 stopped, amplifier 1 is on and there is flow to output 101 and to input 112 of amplifier 2. Therefore, amplifier 2 cuts off and there is no flow to output 102 and no fluid signal passes through delay coil 109. The next hammer 71 not striking near a crack will produce the same effects in cooperation with vane 86.

Now, if the hammer 71 with fin 88'–3 thereon strikes close to the crack in the egg and does not rebound in the time alotted by vane 85, the flow to input 115 will continue after the flow to input 126 has been cut off by vane 85. Flow through input 115 cuts off amplifier 5 causing no flow to output 105 and through input 116 of amplifier 6. Vane 85 has cut off flow through input 126 of amplifier 6 and so with no flow through either of the inputs 116 and 126 of amplifier 6, there is a flow through output 106 which passes a signal through fluidic delay coil 110.

This flow through output 106 is also transmitted to input 125 of amplifier 5 which shuts off amplifier 5 cutting off flow to output 105 and to input 116. Amplifier 5 is in an "off" condition and amplifier 6 is in an "on" condition and they remain this way until vane 85 rotates to a position allowing flow through input 126. Amplifier 6 is then cut off, cutting off flow through output 106 and to input 125. Since fin 88'-3 is still in raised position, there is no flow to the other input 115 and amplifier 5 turns "on" with flow through output 105 and to input 116. Amplifier 6 will now remain cut off and amplifier 5 in an "on" condition until a cracked egg is again encountered.

If the next hammer 71 with fin 88'-4 strikes a portion of the egg not having a crack nearby, it will rebound but the signal from the portion of the system which is associated with the hammer 71 striking the cracked portion is passed through the amplifiers 7 and 8 in the following manner.

Hammer 71 with fin 88'-4 thereon strikes the egg and rebounds and as in the case of amplifiers 1 and 2, there would be no flow at output 108 except that in this case the flow through fluidic delay coil 110 enters input 127 of amplifier 7. When the flow through input 117 is cut off by the return of fin 88'-4 into blocking position, there is still flow through input 127 since this flow has been slowed in reaching amplifier 7 by delay coil 110. Therefore, amplifier 7 does not turn on after the rebound of that hammer 71 carrying fin 88'-4 and there is no flow to output 107 or to input 118 of amplifier 8. Upon the rebound of the hammer, vane 86 has been timed so as to close flow to input 128 and with both inputs to amplifier 8 cut off, that amplifier is turned on and flow takes place through output 108 and passes the fluidic signal on to the next step or, in this case, to the diaphragm operated microswitch 109 which operates a light and a memory device to signify a cracked egg.

With the exhaustion of the fluidic signal to amplifier 7, the flow to input 127 will shut off and with the rotation of vane 86 so as to allow flow to input 128, amplifier 8 will be shut off and amplifier 7 will turn on to await the next series of operations with another egg.

In effect, this logic system of FIG. 8 is a 180° shift register acting as fluidic flip-flop circuits with vanes 85 and 86 acting as resetting means for the flip-flops and to prevent switching during rebound of a hammer 71. There are other types of fluidic logic devices that may be used here, the type shown merely to illustrate an operating form of one embodiment.

After leaving the cracked egg detector section 26, wire cradle conveyor 15 continues to roll the egg on a rail through leak detector section 27. One embodiment of a leak detector is shown in FIG. 9 wherein is shown railing 131 and probe 132. Both railing 131 and probe 132 are connected into an electrical circuit such as shown in FIG. 10. The leak detector works on the principle of an electrolized pair of contacts connected with a resistance measuring device to measure the resistance across the egg. A clean egg with no smeared matter between the contacts has infinite resistance between contact terminals while an egg with its inside material smeared on the shell will disclose a lesser resistance.

Probe 132 is an insulated wire with an uninsulated end portion which passes up through railing 131 and is insulated therefrom. Railing 131 is grounded. If it is a dry egg which is not smeared, then it has an infinite resistance and passes no current. If the egg is smeared, a small current is passed between probe 132 and railing 131 and in conjunction with an amplifier, the current operates a drop solenoid 133. One embodiment of a circuit used in this case is shown in FIG. 10.

When a clean (unsmeared) egg passes over railing 131 and probe 132, there is infinite resistance between terminals 131' and 132' and, therefore, no conduction between those terminals. Transistor Q1 is conducting by virtue of the current through resistance R1 from a positive 24 volt source. Resistance R2 is conducting and because of the saturation of transistor Q1, the voltage at point 134 is equal to ground, transistor Q2 becomes nonconducting and, therefore, no current passes to drop solenoid 133. When a smeared egg passes over the railing 131 and probe 132, there is conduction of current between terminals 132' and 131' which bleeds off current through resistance R1 from the 24 v. source. With its base at ground potential, transistor Q1 stops conducting and with voltage to point 134 through resistance R2 from the 24 volt voltage source, transistor Q2 conducts and passes current to drop solenoid 133. This conduction of transistor Q2 and operation of drop solenoid 133 is also dependent upon completion of the connection between point 134 and the base of transistor Q2 through a crack detector relay.

When a leak is detected and the circuit is completed through a crack detector relay which has been operated to close the circuit upon detection of a crack in the egg during its passage through cracked egg detector section 26, drop solenoid 133 is operated. Drop solenoid 133 is a rotating solenoid which, by gearing, rotates rails 135 so as to separate them and allow the leaky egg to drop therethrough. At this point, the egg is being pushed by wire cradle conveyor 15 and not supported by it.

The leak detector described above is only one possible embodiment. In modifications to this arrangement the eggs need not be rolling on the rails but can be tested for leaks equally well while in closed cradles. In such an embodiment, there is a set of sensing wires located directly over a crack gating device in leak detector section 27. As a cracked leaking egg passes through this section, it runs under the sensor wires where a low resistance condition disables the gating device letting the egg pass on to a second crack gating device which receives the leaking eggs. Sometimes the second crack gating device is shut off if it is preferred to have the leaking eggs appear on a candling spool conveyor where they may be disposed of without totally destroying them.

In general, a resistance reading to accomplish the purpose of the leak detector section may be obtained by having wires of alternate polarity brush against the egg. The track as above and the wire cradles need not form part of the leak detection section circuitry.

The egg is dropped by rails 135 only if it is both cracked and has a smear on it. This is to differentiate between good eggs which have been merely smeared by association with leaky eggs. Also, leaky eggs are separated from eggs which are merely cracked since there is a market for cracked eggs which do not have the membrane beneath the shell also broken and are not leaking. If separation is not made at this point, cracked eggs and leaky eggs will be mixed on the conveyor to which they are transferred and there will be a smeared mess of the cracked eggs eliminating the marketability of merely cracked eggs.

The eggs which are not found to be leaky are continued through the machine, still being rolled by wire cradle conveyor 15 and now over railing 141 past a blood detector unit 142 which may be of a type through which sources of light are passed through the egg and detect blood spots therein such as in Bliss Pat. No. 2,708,515, entitled "Automatic Egg Candler" issued May 17, 1955, or other similar means.

The eggs are rolled on to a level portion of the machine and over a weighing device which can feed appropriate signals to dispose of the eggs to another conveyor if of a weight not desired on spool conveyor 25.

With the raising of the level of the edge of guide bar 67, the pairs of wires 61 forming the cradles close toward each other as in FIG. 5 and lift the egg in a supported position. In this position the cradles approach and pass over solenoid release section 30.

Solenoid release section 30 is operated from a memory device (not shown) which may be of the type comprising a rotating drum upon which electrical signals have been added or where portions of the drum have been magnetized, or, alternatively, a magnetic tape or other type of device which will operate the solenoids therein. When the solenoids 144 and 145 are operated, operation of guides 146 and 147 respectively takes place. Guide 146 is rotated counterclockwise which thereby guides nylon band 66 to lower level 148 which causes the opening action of the cradle as illustrated in FIG. 6. With no railing beneath the cradle at this point the defective egg is dropped onto a conveyor therebeneath. After the egg has been dropped, the nylon band 66 is guided past guide 147 which has been rotated clockwise in conjunction with guide 146 whereby band 66 is returned to the regular higher level of guide bar 67 as illustrated in FIG. 5 wherein the cradles are returned to closed position. If no signal was sent to the memory device regarding defects in the egg then there is no activation of solenoids 144 and 145 and nylon band 66 travels over guides 146 and 147 and guide bar 149 staying on the upper level of guide bar 67 and thereby maintaining cradles closed and carrying the eggs to the next station.

The last station of wire cradle conveyor 15 transfer devices 14' reach down and lift the eggs off conveyor 15. Transfer devices 14' act in a similar manner to transfer devices 14 which placed the eggs on conveyor 15 but are rotated in the direction so as to move with the eggs on the high speed conveyor or conveyor 15, lift them off and swing them up and then over to spool conveyor 25 upon which they are lowered and released. As mentioned previously, the construction of conveyor 15 is such that proper placement of the conveyor in relation to spool conveyor 25 could allow this transfer without use of a transfer device 14'.

The eggs on spool conveyor 25 are then further inspected as necessary and transported to packaging devices.

The machine of the present invention performs a variety of inspections eliminating the necessity for close inspection by the operator at the end of the run and keeps eggs moving from a slower to a faster conveyor on which the inspection is performed and then back to a slower conveyor with transfer means calculated to handle fragile articles with timed relationship from beginning to the leaving of the machine by the eggs.

It will be obvious to those skilled in the art that various changes may be made without departing from the scope of the invention.

What is claimed is:

1. A machine for selection of eggs according to quality comprising
first conveyor means carrying eggs in side-by-side relationship to the machine,
second conveyor means moving at a faster rate than said first conveyor means and positioned adjacent to said first conveyor means to receive eggs from said first conveyor means,
means to inspect the eggs on said second conveyor means located along said second conveyor means,
and means to remove eggs rejected by said inspection means from said second conveyor means,
said second conveyor means including
links forming opposite sides of said second conveyor means,
wire members having opposite ends passing through said side links of said second conveyor means,
two of said wire members passing through one said side link on each side of said second conveyor means,
and two adjacent ones of said wire members not passing through the same said side link on each side of said second conveyor means forming a cradle to support an egg on said second conveyor means.

2. The machine of claim 1, further characterized by a guide bar adjacent the side of said second conveyor means,
said wire members having at least one end riding on said guide bar
whereby the contour of said guide bar determines the opening and closing of said cradles formed by pairs of said wire members.

3. The machine of claim 2, further characterized by railing located beneath portions of said second conveyor means,
and indentations to a lower level in said guide bar along at least a portion of said second conveyor means located above said railing.

4. A machine for selection of eggs according to quality comprising
first conveyor means carrying eggs in side-by-side relationship to the machine,
second conveyor means moving at a faster rate than said first conveyor means and positioned adjacent to said first conveyor means to receive eggs from said first conveyor means,
means to inspect the eggs on said second conveyor means located along said second conveyor means,
means to remove eggs rejected by said inspection means from said second conveyor means,
transfer devices to lift eggs from said first conveyor means and deposit them in single file on said second conveyor means,
cam means connected to move said transfer devices,
and mechanical means connected to open and close said transfer devices.

5. The machine of claim 4, further characterized by said transfer devices each being rotated through an arc of approximately 90° by said cam means while being rotated through an angle of approximately 90°.

6. The machine of claim 4, further characterized by vacuum means connected to each of said transfer devices,
said vacuum means connected in operating relationship with said mechanical means to move said mechanical means.

7. A machine for selection of eggs according to quality comprising
first conveyor means carrying eggs in side-by-side relationship to the machine,
second conveyor means moving at a faster rate than said first conveyor means and positioned adjacent to said first conveyor means to receive eggs from said first conveyor means,
means to inspect the eggs on said second conveyor means located along said second conveyor means,
means to remove eggs rejected by said inspection means from said second conveyor means,
said means to inspect the eggs including cracked egg detection means and leak detection means,
and separating means to remove leaky eggs from said second conveyor means connected to be activated by cooperative action of both said cracked egg detection means and said leak detection means.

8. The machine of claim 7, further characterized by said leak detection means including electrical probes of opposite polarity in the path of the eggs on said second conveyor positioned to contact the passing eggs on said second conveyor.

9. A machine for selection of eggs according to quality comprising
first conveyor means carrying eggs in side-by-side relationship to the machine,
second conveyor means moving at a faster rate than said first conveyor means and positioned adjacent to said first conveyor means to receive eggs from said first conveyor means,
means to inspect the eggs on said second conveyor means located along said second conveyor means,
means to remove eggs rejected by said inspection means from said second conveyor means,
and a guide bar adjacent the side of said second conveyor means,
said means to remove eggs including
a pair of co-acting solenoids means, the first of said pair of solenoid means rotating a section of said guide bar in a counterclockwise direction and the second of said pair of solenoid means rotating a second section of said guide bar in a clockwise direction whereby an egg is released from said second conveyor means.

10. A machine for selection of eggs according to quality comprising
    first conveyor means carrying eggs in side-by-side relationship to the machine,
    second conveyor means moving at a faster rate than said first conveyor means and positioned adjacent to said first conveyor means to receive eggs from said first conveyor means,
    means to inspect the eggs on said second conveyor means located along said second conveyor means,
    and means to remove eggs rejected by said inspection means from said second conveyor means,
    said means to inspect the eggs including
        a crack egg detection means,
        leak detection means in line with said cracked egg detection means,
        and blood detection means in line with both said previously mentioned detection means.

11. The machine of claim 10, further characterized by said cracked egg detection means including
    a plurality of hammers positioned for striking different portions of a passing egg,
    and fluidic operated amplifier means arranged in shift register configuration for detecting lack of rebound from one or more of said hammers.

References Cited
UNITED STATES PATENTS

| | | | |
|---|---|---|---|
| 2,843,250 | 7/1958 | Niederer et al. | 209—121 X |
| 3,100,571 | 8/1963 | Reck et al. | 209—121 |
| 3,118,548 | 1/1964 | Bliss et al. | 214—1 |
| 2,697,516 | 12/1954 | Sneed | 209—121 |
| 2,978,952 | 4/1961 | Stucky | 209—73 X |
| 3,135,386 | 6/1964 | Reading | 209—121 |
| 3,315,782 | 4/1967 | Eldred | 198—32 |
| 3,319,762 | 5/1967 | Rose | 198—32 |
| 3,370,691 | 2/1968 | Mosterd | 198—32 |

ALLEN N. KNOWLES, Primary Examiner

U.S. Cl. X.R.

73—12; 209—74, 75, 79, 81